(No Model.)
L. L. SAGENDORPH.
APPARATUS FOR MANUFACTURING FLEXIBLE ROOFING MATERIAL.
No. 310,544. Patented Jan. 6, 1885.
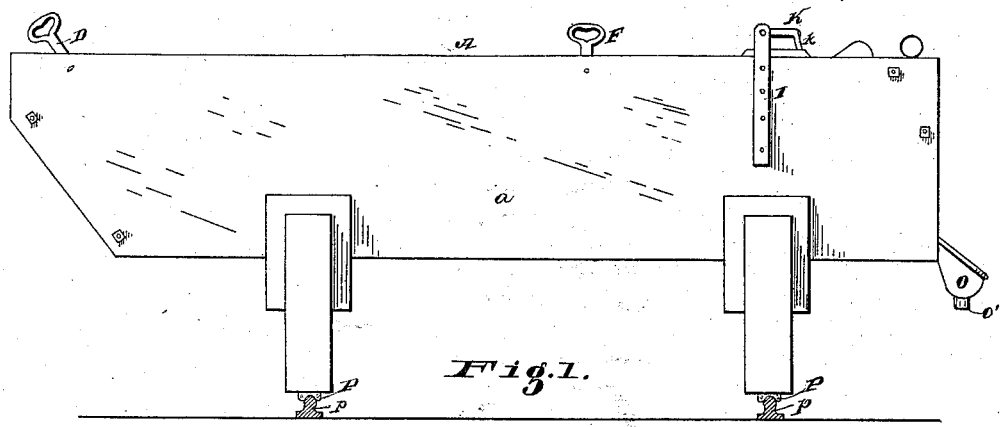
Fig. 1.
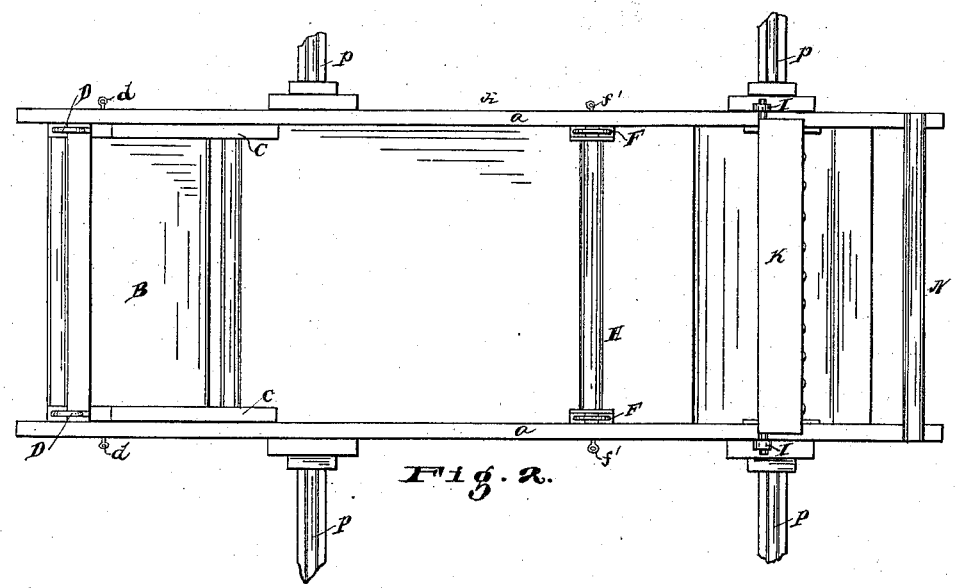
Fig. 2.
Fig. 3.
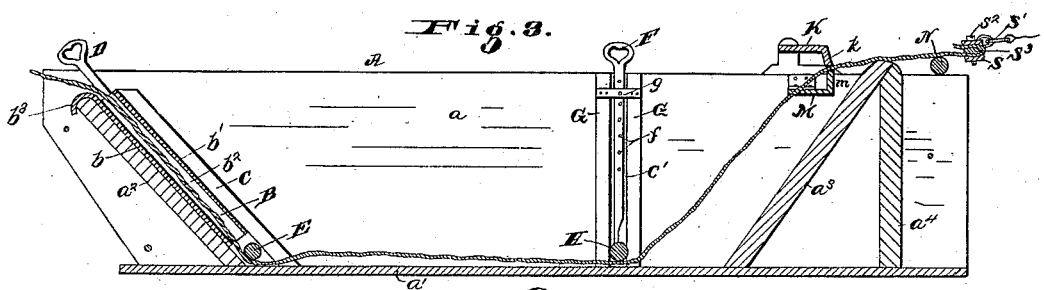
ATTEST.
Ed. R. Hill
Walter Chamberlin
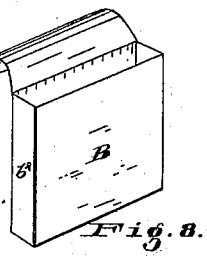
Fig. 8.
INVENTOR.
L. Lewis Sagendorph (No Model.)  2 Sheets—Sheet 2.
L. L. SAGENDORPH.
APPARATUS FOR MANUFACTURING FLEXIBLE ROOFING MATERIAL.
No. 310,544. Patented Jan. 6, 1885.
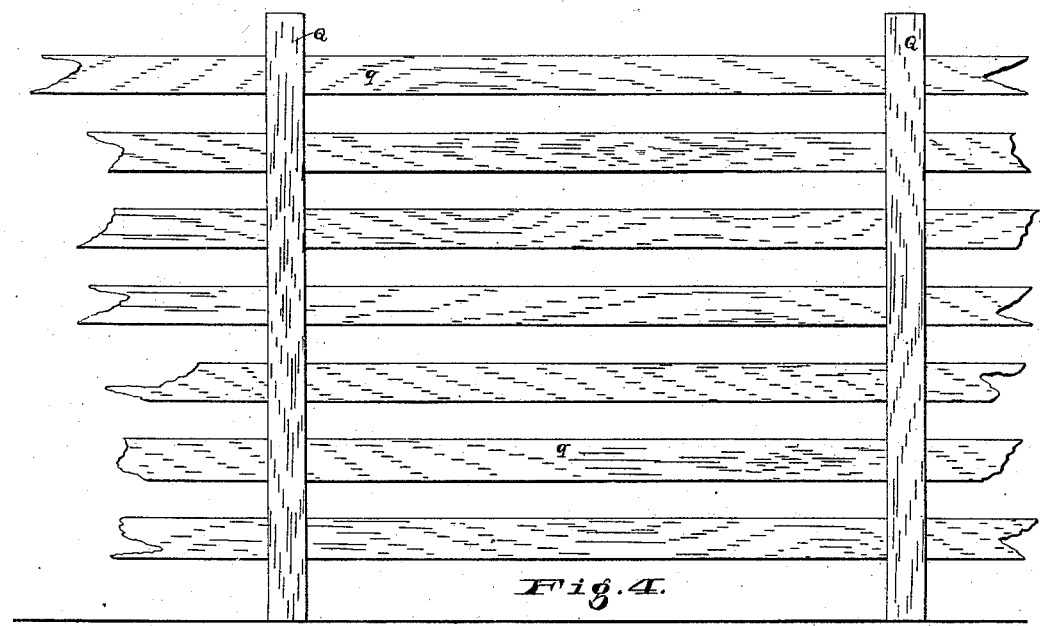
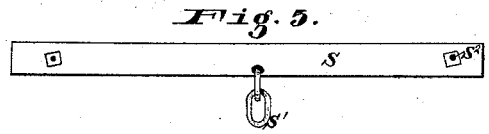
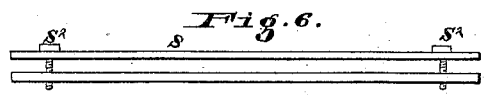
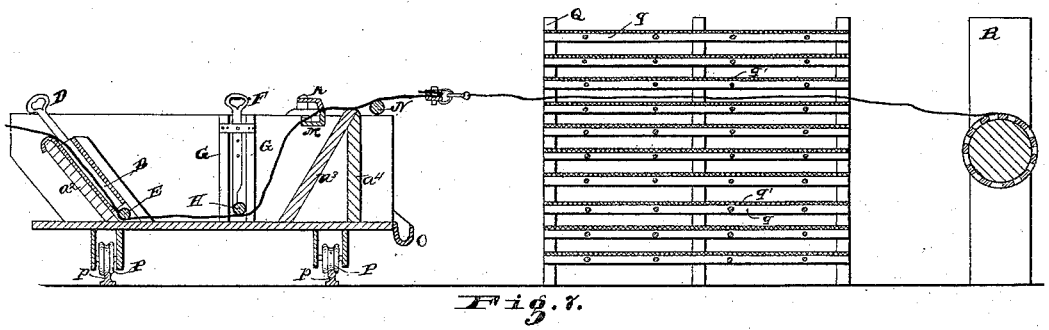
ATTEST.
Ed. R. Hill,
Walter Chamberlin
INVENTOR.
L. Lewis Sagendorph.

UNITED STATES PATENT OFFICE.

L. LEWIS SAGENDORPH, OF CINCINNATI, OHIO, ASSIGNOR OF ONE-HALF TO H. P. LLOYD, OF SAME PLACE.

APPARATUS FOR MANUFACTURING FLEXIBLE ROOFING MATERIAL.

SPECIFICATION forming part of Letters Patent No. 310,544, dated January 6, 1885.

Application filed July 26, 1883. Renewed September 15, 1884. (No model.)

*To all whom it may concern:*

Be it known that I, L. LEWIS SAGENDORPH, a resident of the city of Cincinnati, Hamilton county, and State of Ohio, have invented certain new and useful Improvements in Apparatus for Manufacturing Flexible Roofing Materials, of which the following is a specification.

For many years composition roofings have been in vogue. A favorite form of manufacturing this roofing has been to impregnate paper, ducking, canvas, or similar material with a composition which would render it weather-proof, and in some instances fire-proof. The article so prepared was then used as the outer covering of the roof. Materials of this kind soon came to be applied to other purposes than the mere roofing of buildings, especially for steamboat-roofs, skiff-covers, awnings, tarpaulins, and other articles requiring a thin weather-proof or fire-proof covering. The manufacture of this material has, however, been attended with considerable embarrassment, owing to the primitive machinery used. Difficulties have been met in saturating the basis with the composition, and also in keeping a homogeneous distribution of the composition through the basis during the process of drying. To remove these difficulties has been the object of my invention, which may be said to consist of several principal factors: first, certain improvements in the apparatus for preparing the material, by which a thorough and homogeneous distribution of the composition throughout the basis is attained, and, second, an improved drying apparatus, which prevents a disturbance of the composition in the basis during the process of drying. A third principal feature of my invention is an improved clutch used in drawing the paper, canvas, or other material used as the basis of the roofing, through the composition and into and through the drying-racks.

In the accompanying drawings, Figure 1 represents a side view of the tank in which the composition is applied to the basis. Fig. 2 is a top view, and Fig. 3 a central longitudinal section, of the same. Fig. 4 is a side view of a section of the racks used in the drying process. Figs. 5 and 6 are respectively a top and side view of the improved clutch. Fig. 7 is a section view of the entire apparatus, showing at a glance the whole process. Fig. 8 is a view in perspective of the box for forming what may be called a "liquid joint."

The tank A consists of two sides, $a$, a bottom, $a'$, and two inclined ends, $a^2$ and $a^3$. It may also be provided with an additional end piece, $a^4$, for strengthening the frame of the tank.

Resting on the end $a^2$ is the guard-box B. This guard-box B consists of two plates, $b$ and $b'$, united at their ends by pieces or plates $b^2$, thus forming a rectangular box open at the ends. The plate $b$ is provided with a curved lip, $b^3$, which laps over the top of the end $a^2$, and in this way prevents the guard-box B from slipping too far into the tank, and also steadies the latter. A cleat, C, is secured to each side $a$ of the tank A, and holds the guide-box B in position. The guard-box B extends almost entirely across the tank A, leaving sufficient room only at either end to accommodate the arms or handles D. These arms or handles D are situated between the ends of the guard-box B and the sides $a$, and also between the ends $a^2$ and the cleat C in the guideways C', or suitable guideways, and at their lower extremities are attached to the roller E. It will be observed that the guard-box B does not extend as far down in the tank as to touch the roller E. This arrangement is to allow an adjustment of the position of the roller E with reference to the bottom of the tank A. When it is desired to have the roller E close to the bottom of the tank A, the arms D are depressed, and when it is desired to have the roller E at a greater distance from the bottom of the tank A they are raised. In either position they are secured by suitable fastenings— as, for example, pins $d$, which pass through the sides $a$ into perforations in the arms D, similar to the perforations in the handles or arms F, to be presently described. Two cleats, G, form guides for the handles or arms F, which are held in position by the cross-piece $g$, and have at their lower ends the roller H. These arms F slide in guideways C', formed by the cleats or equivalent guides. These arms F are provided with a series of perforations, $f$, into which the pins $f'$, after passing through the sides $a$, are inserted, thus holding the roller H at any desired distance from the bottom of the tank A.

Attached to the sides of the tank A are uprights I, to which the scraper K is hinged. Scraper K has a downwardly-projecting lip, $k$. Secured to the sides of the tank, preferably by bolts, is the scraper M, having the lip $m$ immediately below the lip $k$. A stationary bar, N, is attached to the sides of the tank outside the end $a^4$.

In Figs. 1 and 7 a drip-tank, O, is shown. This drip-tank extends from side to side of the tank, and is provided with the waste-pipe O′. When the tank A is to be used in connection with a series of racks placed side by side, the tank A is provided with wheels P, or runways attached to it in any convenient manner, by which it slides along the track or guides $p$. Each drying-rack has two sides, each of which consists of uprights Q, to which are attached slats $q$. Between corresponding slats, $q$, of the opposite sides of the rack a rack of slats, or of coarse meshed wire or netting, $q'$, is located. The distance between the two sides of the drying-rack is such as to accommodate the width of the paper or canvas or other flexible material used. In Fig. 7 two of these racks are shown placed end to end. In actual practice the length and number of the racks in line is determined by the length of the flexible material to be handled. Behind each set of racks a windlass, R, is placed.

The improved clutch, mentioned as the third feature of my invention, consists, preferably, of two flat bars, S, united by screws S², and provided at its middle with one or more links, S′.

The mode of operation of my apparatus is as follows: The tank is first filled with a suitable composition in a liquid or semi-liquid state, and which is to be applied to the basis, whatever the flexible material may be. The end of the flexible material used as the basis is now brought downward through the box B, under the roller E, over the bottom $a^2$, through the composition, under the roller H, then up to the scraping apparatus, passing between the lips $k$ and $m$. It then passes over the stationary bar N to the clutch S, to which it is attached in the manner shown in Figs. 3 and 7—viz., the end of the flexible material is turned over a piece, S³, which is then clamped between the sides S by means of the clamping-screw S². It is then drawn onto one of the floors of the rack and left to dry.

It is a matter of great difficulty in all compositions to keep the solution homogeneous throughout, the heavier ingredients sinking to the bottom. Now, it is usually those heavier ingredients which are the essential ones in the solution—the ingredients which give to the resulting product its qualities of resisting weather or fire.

In the ordinary apparatus now in vogue no effort is made to have the flexible material pass through these thicker portions of the composition, and in consequence parts of it will pass through the lighter portions and parts through the heavier, thus producing an irregular product. In my apparatus provision is made for obviating the irregular application of the composition by the two sets of handles D and F, in connection with the box B. The handles or arms aforesaid serve to hold the rollers, and by means of the latter the flexible material is held as close to the bottom of the tank as desired, and in connection with the heavier portion of the composition. The function of the box B is to guard the flexible material as it enters the tank, and while passing down to the heavier portion of the composition, lying near or at the bottom of the tank, from too great an influx of the lighter materials of the composition at the upper part of the tank, and which, if not prevented by the box B, would be quickly absorbed in great quantity by the incoming flexible material, and the pores or interstices or equivalent spaces, usually present in the flexible material, would be filled by and with the said lighter materials of the composition, thus leaving no room for the entrance of the heavier materials of the composition to or into the said flexible material. Another great advantage of my apparatus lies in the scraping device.

Heretofore flexible material has been passed between two rollers, which remove the superfluous amount of composition, but also do more, and that is they squeeze out more of the composition than is desired and at the same time the pressure of the roll breaks or injures the substance of the material. With my device the flexible material is scraped smoothly and nicely, and the pressure of the scraper K, is regulated by a spring or weight placed on it, and a sufficient amount of composition is left evenly distributed throughout the flexible material, the latter being in no wise injured by the action of the scraper.

The method of drying also presents several advantages. By being kept in a horizontal position the composition does not change its position in the flexible material, as it would do if the sheets were hung up to dry. The open rack-work and the spaces between the various rack-shelves allow the air to circulate freely about the material, and the drying is consequently more rapidly accomplished than it could be by any other means.

While the various features of my invention are preferably employed together, one or more of said features may be employed without the remainder, and when desired one or more of said features may be employed, so far as applicable, in connection with apparatus or parts of apparatus for coating flexible substances other than those herein described.

What I claim as new and of my invention, and desire to secure by Letters Patent, is—

1. The combination of the tank, guide B, and roller E, located at or near the foot of the guide B, substantially as and for the purposes specified.

2. The combination of the tank, guide B, rollers E and H, substantially as and for the purposes specified.

3. An apparatus for removing the surplus of composition, consisting of two lips, one fixed and the other removable, the working-edges of said lips being opposite one another, substantially as and for the purposes specified.

4. The tank A, provided with guide B, rollers E and H, arms D and F, and scrapers M and K, substantially as and for the purposes set forth.

5. The guard-box B, located in the tank, substantially as and for the purposes set forth.

6. The improved apparatus for preparing flexible materials, consisting of the tank A, constructed substantially as described, and drying apparatus separated from said tank and consisting of series of racks Q q, substantially as and for the purposes described.

7. The guard-box B, provided with lip, and located in the front end of the tank, substantially as and for the purposes specified.

8. The guard-box B, and the depressing-rollers and their supporting arms, and guides, substantially as and for the purposes described.

9. In the tank, the combination of guard-box B and roller E, and arms D, and guideways, substantially as and for the purposes specified.

10. The roller E and arms D, sliding in guideways C, and provided with handle, and a setting device, for securing the roller at any desired height, located at the front portion of the tank, substantially as and for the purposes specified.

11. In a tank for imparting a composition to flexible material, the roller H, arms F, and guides B, substantially as and for the purposes set forth.

12. In a tank for imparting a composition to flexible material, the roller H and arms F, guides B, and device for adjusting the distance of the roller from the bottom of the tank, and securing the rollers at a given point, substantially as and for the purposes described.

L. LEWIS SAGENDORPH.

Attest:
ED. R. HILL,
J. WM. STREHLI.